(12) United States Patent  (10) Patent No.: US 7,502,716 B2
Bourne et al.  (45) Date of Patent: Mar. 10, 2009

(54) CLOSED-LOOP DIAGNOSTIC METHOD

(75) Inventors: Donald A. Bourne, Toronto (CA); Michael J. Casile, Fuquay-Varina, NC (US); Hany A. Salem, Pflugerville, TX (US); Leigh A. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 11/400,961

(22) Filed: Apr. 10, 2006

(65) Prior Publication Data

US 2007/0239397 A1  Oct. 11, 2007

(51) Int. Cl.
*G06F 11/30* (2006.01)
*G21C 17/00* (2006.01)

(52) U.S. Cl. .................. 702/183; 702/123; 702/189; 702/190; 707/104.1; 709/224

(58) Field of Classification Search ................ 702/183, 702/188–191, 119–123, 184–187; 707/104.1; 709/206, 224
See application file for complete search history.

(56) References Cited

U.S. PATENT DOCUMENTS

| 6,134,481 | A | 10/2000 | Warren | |
|---|---|---|---|---|
| 6,591,228 | B1 | 7/2003 | Hall et al. | |
| 2003/0005179 | A1* | 1/2003 | Schmit et al. | 709/328 |
| 2003/0093471 | A1* | 5/2003 | Upton | 709/203 |

FOREIGN PATENT DOCUMENTS

EP  0642079 A1  3/1995

OTHER PUBLICATIONS

Web Services Distributed Management: Management Using Web Services (MUWS 1.0) Part 1, Mar. 9, 2005, p. 30, Publisher: OASIS Standard.
Web Services Distributed Management: Management Using Web Services (MUWS 1.0) Part 2, Mar. 9, 2005, p. 53, Publisher: OASIS Standard.
Errata for Web Services Distributed Management: Management Using Web Services (MUWS 1.0) Part 1, Mar. 8, 2005, p. 4, Publisher: OASIS, Committee Draft.

(Continued)

*Primary Examiner*—Eliseo Ramos Feliciano
*Assistant Examiner*—Phuong Huynh
(74) *Attorney, Agent, or Firm*—Marcia L. Doubet; Stephen A. Calogero

(57) ABSTRACT

Problem diagnostics may be obtained from components that log messages using a unique component identifier which is provided within each message so as to enable routing of callbacks to the component that originated the message. Similarly, problem diagnostics may be obtained from components that generate alerts, where the alerts contain the unique identifier of the component that generated the alert. Each component supports a diagnostic provider interface comprising operations which may be dynamically invoked, for example to solicit information from the component such as its configuration data, its state information, to execute self-diagnostic tests, and so forth. In addition or instead, operations may be provided that can be invoked to cause the component to alter its configuration data (such as notifying the component to change its level of message logging) or its behavior.

26 Claims, 12 Drawing Sheets

OTHER PUBLICATIONS

Errata for web Services Distributed Management: Management Using Web Services (MUWS 1.0) Part 2, Mar. 8, 2005, p. 4, Publisher: OASIS, Committee Draft.
Events Schema <http://docs.oasis-open.org/wsdm/2004/12/muws/wsdm-muws-part2-events.xml>. Printed Mar. 28, 2006, 2004, p. 2, Publisher: OASIS.
Part 2 WSDL <http://docs.oasis-open.org/wsdm/2004/12/muws/wsdm-muws-part2.wsdl>. Printed Mar. 28, 2005., 2004, p. 2, Publisher: OASIS.
Part 2 Schema <http://docs.oasis-open.org/wsdm/2004/12/muws/wsdm-muws-part2.xsd>. Printed on Mar. 28, 2006., 2004, p. 7, Publisher: OASIS.
1.0 Schema <http://docs.oasis-open.org/wsdm/2004/12/muws/wsdm-pbm.xsd>. Printed on Mar. 28, 2006., 2004, p. 1, Publisher: OASIS.
Part 1.0 Schema <http://docs.oasis-open.org/wsdm/2004/12/muws/wsdm-muws-part1.xsd>. Printed on Mar. 28, 2006., 2004, p. 2, Publisher: OASIS.

* cited by examiner

```
<?xml version="1.0" encoding="UTF-8"?>
<!DOCTYPE MBean SYSTEM "MbeanDescriptor.dtd">
<MBean type="DiagnosticProvider"

<operation
    description="Dump the state information
                associated with managed resource."
    impact="INFO" name="stateDump" role="operation"
    targetObjectType="objectReference"
    type="[Lcom.ibm.wsspi.rasdiag.DiagnosticEvent;">
    <signature>
      <parameter description="Attribute ID to use"
        name="attributeId" type="java.lang.String"/>
    </signature>
  </operation>

<operation
    description="Dump configuration information
                for the managed resource."
    impact="INFO" name="configDump" role="operation"
    targetObjectType="objectReference"
    type="[Lcom.ibm.wsspi.rasdiag.DiagnosticEvent;">
    <signature>
      <parameter description="Attribute ID to use"
        name="attributeId" type="java.lang.String"/>
    </signature>
  </operation>
```

```
<portType name="DiagnosticProviderInterface">

<operation name="ViewComponentState">
    <input message="InViewComponentStateRequest"/>
    <output message="OutViewComponentStateResponse"/>
  </operation>

<operation name="ViewComponentConfig">
    <input message="InViewComponentConfigRequest"/>
    <output message="OutViewComponentConfigResponse"/>
  </operation>

<operation name="GetDiagnosticsList">
    <input message="InGetDiagnosticsListRequest"/>
    <output message="OutGetDiagnosticsListResponse"/>
  </operation>

<operation name="RunDiagnostics">
    <input message="InRunDiagnosticsRequest"/>
    <output message="OutRunDiagnosticsResponse"/>
  </operation>

</portType>
```

410 — ViewComponentState
420 — ViewComponentConfig
430 — GetDiagnosticsList
440 — RunDiagnostics

FIG. 4B

```
411    <message name="InViewComponentStateRequest">
         <part name="authToken" type="string"/>   412
       </message>

415    <message name="OutViewComponentStateResponse">
         <part name="currentState" type="string"/>   416
       </message>

421    <message name="InViewComponentConfigRequest">
         <part name="authToken" type="string"/>
       </message>

425    <message name="OutViewComponentConfigResponse">
         <part name="currentConfig" type="string"/>   426
       </message>

431    <message name="InGetDiasnosticsListRequest">
         <part name="authToken" type="string"/>
       </message>

435    <message name="OuGetDiasnosticsListResponse">
         <part name="diagList" type="array"/>   436
       </message>

441    <message name="InRunDiagnosticsRequest">
         <part name="authToken" type="string"/>
         <part name="testID" type="string"/>   442
       </message>

445    <message name="OutRunDiagnosticsResponse">
         <part name="diagResults" type="string"/>   446
       </message>
```

Message
  Processing extension point com.ibm.ws.runtime.eclipse.configservice-metadata Message Type
  Information Explanation
  No explanation found for message Suggested User Action
  No suggested user action found for message Message Originator Name
  com.ibm.ws.management.configservice.CSMetadataManager Source Object Type
  RASLoggingService Timestamp
  March 4, 2006 12:34:56 PM EDT Thread ID
  33

Node Name
  AppServerNode

Server Name
  Server123

Diagnostic Provider ID
  ComponentABC

710 — View State Data
711 — View Configuration Data
712 — Run Self-Diagnostic Tests Back

CLOSED-LOOP DIAGNOSTIC METHOD

BACKGROUND OF THE INVENTION

The present invention relates to computer programming, and deals more particularly with problem diagnostic information which may be obtained from components.

Complex information technology ("IT") systems are generally composites of many components which communicate over various interfaces and buses. Troubleshooting such systems can be difficult, as it may not be obvious which component is manifesting a problem and, if applicable, what other component(s) may have contributed to the problem. Once the component(s) is/are identified, it is often the case that component-specific knowledge is needed to understand and isolate the problem, and to do further diagnosis or to perform problem resolution.

BRIEF SUMMARY OF THE IVENTION

The present invention defines techniques for obtaining diagnostic information from components and/or resources which are accessible to components. In one aspect, the present invention is directed to a computer-implemented component diagnostic method, comprising: including, in each message generated by each of a plurality of components, a unique component identifier that identifies the generating component; and providing, for each of the components, a diagnostic provider interface, the diagnostic provider interface for each component comprising at least one operation implemented by that component, the operation being invocable by a callback to the component, wherein the unique component identifiers enable identifying that one of the components to which each callback is to be routed.

This aspect may further comprise executing at least one of the operations provided in the diagnostic provider interface of a selected one of the components in response to an invocation by a callback received at the selected component. The received callback may comprise a request for further information from the selected component, and this requested further information may comprise, as one example, current state information of the selected component or, as another example, current configuration information of the selected component. As an alternative to requesting further information, the received callback may comprise, as one example, a request for the selected component to provide a list of diagnostic tests available for execution by the selected component or, as another example, a request for execution of at least one diagnostic test by the selected component.

The received callback may, as one example, be generated responsive to evaluation of at least one message generated by the selected component. As another example, the received callback may be generated responsive to evaluation of at least one message generated by another component or components distinct from the selected component.

The method may further (or alternatively) comprise including, in each alert generated by each of the components, the unique component identifier for identifying the generating component. In this case, the method may further comprise executing of at least one of the operations provided in the diagnostic provider interface of a selected one of the components in response to an invocation by a callback received at the selected component, and the received callback may be generated (as one example) responsive to evaluation of at least one alert generated by the selected component. As another example, the executing may occur responsive to evaluation of an alert, or a plurality of alerts, generated by another component or components distinct from the selected component.

The method may comprise registering the unique component identifier during an initialization phase, wherein each unique component identifier includes information indicating existence of the diagnostic interface provided for each respective component. The method may further comprise registering a diagnostic interface specification for each component. Each diagnostic interface specification preferably specifies a method signature for each of the invocable operations implemented by that component, and the method signature for at least one of the invocable operations may comprise a (parameter name, parameter type) pair for each parameter of that invocable operation. Preferably, the diagnostic interface provided for each component specifies at least one of at least one state attribute for which state information can be dumped by that component, at least one configuration attribute for which configuration information can be dumped by that component, and at least one diagnostic test that can be carried out by that component.

The method may further comprise generating, for each of the components, the unique component identifier during an initialization of the component. The unique component identifier for each component may be generated as the unique object name of an instance of the component, and/or may be generated using topology information of the component.

The method may further comprise: including, in each message generated for at least one resource which is accessible from a selected one of the components, the unique component identifier that identifies the selected component; and providing, in the diagnostic provider interface for the selected component, at least one operation implemented by that component, the operation being invocable by a callback to the component to interact with each of the at least one resources. In this case, the method may further comprise executing, for a selected one of the resources which is accessible from the selected component, at least one of the operations provided in the diagnostic provider interface of the selected component in response to an invocation by a callback received at the selected component to interact with the selected resource.

Each of the callbacks for a selected component preferably uses the unique component identifier of the selected component.

In another aspect, the present invention is directed to a programmatic method of performing component diagnostics, comprising: including, in each message generated by each of a plurality of components, a unique component identifier that identifies the generating component; providing, for each of the components, a diagnostic provider interface for that component, the diagnostic provider interface for each component comprising at least one invocable operation implemented by that component, the operation being invocable by a callback to the component; and using the unique component identifiers to route callbacks to selected ones of the components, wherein each of the callbacks comprises invoking one of the at least one invocable operations implemented by the selected one of the components.

In another aspect, the present invention is directed to a programmatic method of component diagnosis, comprising: evaluating at least one message generated by a component, wherein the evaluated message comprises a unique component identifier that identifies the generating component; identifying an operation implemented by the component in a diagnostic provider interface; and using the unique component identifier from the at least one evaluated message in an invocation that calls back to the component to request execution of the identified operation, thereby enabling routing of the invocation to the component. In one embodiment, the operation is identified by consulting a registry in which the component registers each of at least one operation implemented in its diagnostic provider interface. The operation may comprise a request for the component to dump state information, a request for the component to dump configuration information, a request for the component to provide a list of diagnostic tests available for execution by the component, or a request for the component to execute at least one diagnostic test.

It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 4 (comprising FIGS. 4A-4B) provides an alternative version of the sample diagnostic provider interface in FIG. 3, where this alternative version may be used in an alternative execution environment;

FIG. 7 provides a sample web page display that may be rendered, responsive to an administrator's selection of a logged message to request further information therefor;

DETAILED DESCRIPTION OF THE INVENTION

Meaningful messages, message coding systems, and messages with significant context are all in use in many products to help with problem determination. These messages often include information about the originator of the message, such as a class name and/or method name when using object-oriented programming, line number of code at which the message was generated (or at which the problem was detected), process identifier of the process in which the code is executing, and/or thread identifier of the thread executing the code. A current limitation to this approach for identifying a message source is that there is no programmatic way to call back to the originator to communicate with it. (As used herein, "call back", "callback", and related terms refer to invocation, by an entity external to a component, of an operation provided by that component, and include requests for information from the component.) Instead, the message recipient is typically left to read product documentation (if any) to understand what to do with the message and how to proceed. Expert users of such products may, over time, learn what to do when they see a particular message, but novice users frequently must call technical support to get help.

The current technique of emitting messages into message logs is akin to leaving a computer-generated phone message with no return phone number: there is no way to call back to the message source for clarification or to get more information. Preferred embodiments address this problem, providing techniques for programmatic call-back to the originator of an emitted message. The programmatic call-back preferably allows gathering additional information about the component that emitted the message, as will be described in more detail herein.

According to a preferred embodiment, each component (and optionally, each sub-component) in the IT system is assigned a unique identifier. (Components are also referred to herein as diagnostic providers.) As messages are created for detected problems, the detecting component's identifier is included in the message payload, thereby identifying which component generated the message to record the problem.

Figures 1, 6:
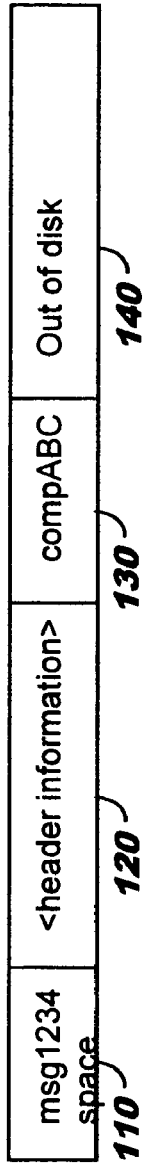
FIG. 1 provides a sample message structure that may be used with embodiments of the present invention.
FIG. 6 shows an illustrative user interface display that may be rendered for a hypothetical set of logged messages.

See FIG. 1, which provides a sample message structure 100 that may be used with embodiments of the present invention. As shown therein, a message may comprise a message identifier 110, which is "msg1234" in this sample message; various message header information 120 (which is typically application-specific, and which is therefore shown in an abstract manner in FIG. 1); an originating component identifier 130, as disclosed herein, which is "compABC" in this sample message; and message text 140, which is "Out of disk space" in this sample message. (It will be obvious to those of skill in the art that, while simple, relatively short component identifiers have been used herein for ease of reference, the unique component identifiers used in preferred embodiments may be more complex and/or may comprise data of a different format.) Optionally, a message may comprise a unique identifier of one or more "diagnostic provider interface" (discussed further below) associated with the originating component, and may also provide an identification of the operations enabled by that one or more diagnostic provider interface.

As indicated above, according to preferred embodiments of the present invention, components of the IT system implement an interface, referred to herein as a "diagnostic provider interface" or "DP interface", which provides operations useful for in-depth problem determination. This interface preferably includes operations to collect state information about a component, gather configuration information about a component, and run component self-diagnostics, and may optionally include operations to change the component's level of message logging, change the component's configuration, and so forth. (Additional, fewer, or different operations may be supported without deviating from the scope of the present invention.)

Preferably, each component registers its diagnostic interface and its unique identifier at a central service that has the ability to communicate with external programs. These programs may include, by way of illustration, one or more applications (or systems) which are adapted for monitoring operation of one or more components of the IT system; performing problem detection and determination; collecting data about components of the IT system; and perhaps suggesting problem resolution. Techniques disclosed herein enable these external programs to gather further information (which may then be used in application-specific ways), responsive to detecting that a message has been generated, as will be described.

Figure 2:
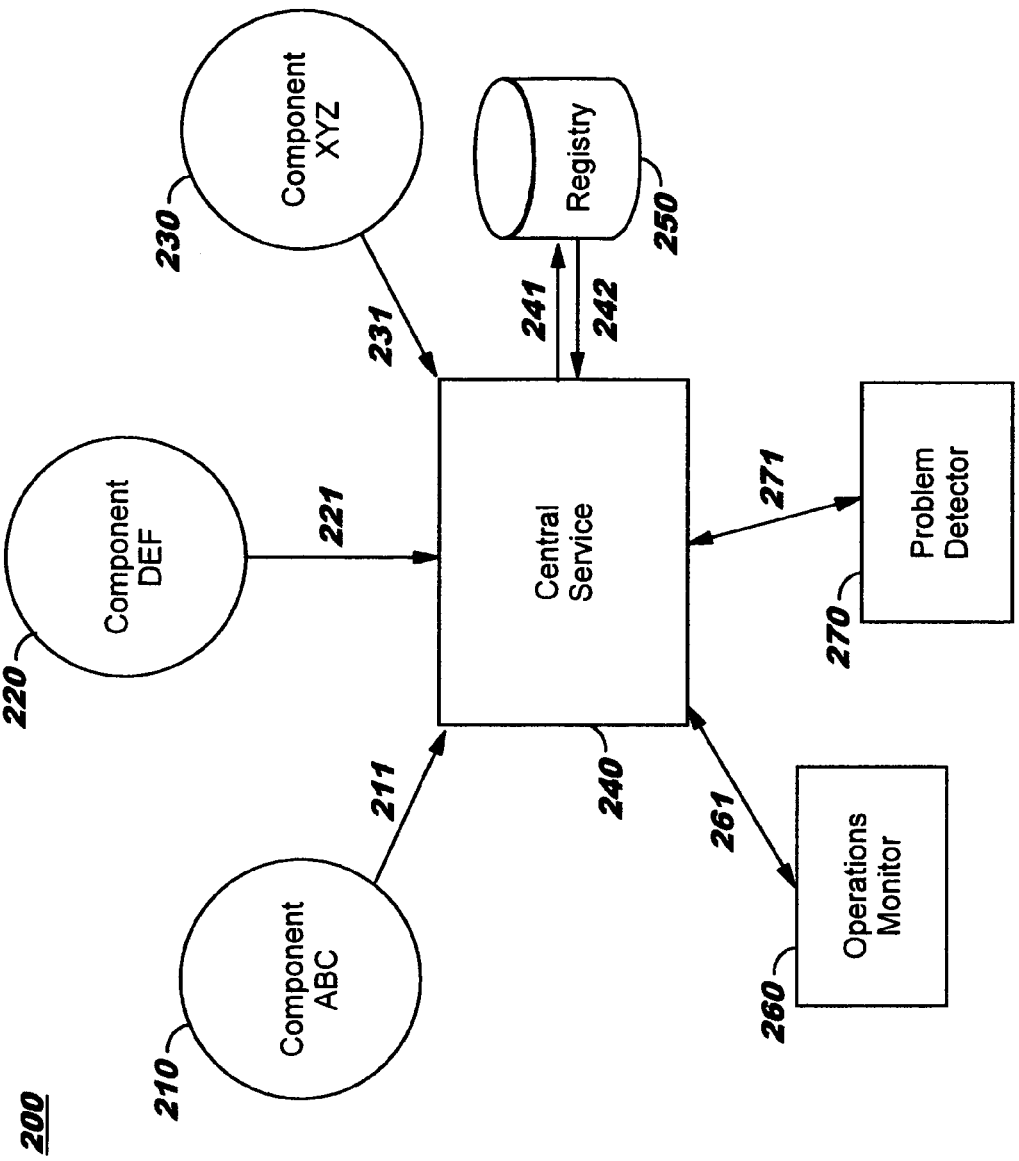
FIG. 2 depicts components of a hypothetical information technology system.
Figure 3B:
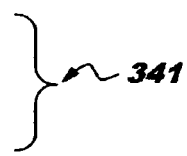
FIG. 3 (comprising FIGS. 3A and 3B) provides a sample diagnostic provider interface that enables a requester to view state information, view configuration information, and execute diagnostic tests.

FIG. 2 depicts components of a hypothetical IT system 200. As shown therein, components with identifiers "ABC" 210, "DEF" 220, and "XYZ" 230 send registration messages 211, 221, 231 to a central service 240, where each registration message preferably comprises the component's unique identifier, with the unique identifier including an indication of whether the component includes a diagnostic interface. Optionally, depending on the implementation, the registration message may include further information pertaining to a component's diagnostic interface (such as a specification of the operations provided in the component's diagnostic interface; see the samples provided in FIGS. 3 and 4, which are discussed below). A registry 250 may be used by central service 240 to record 241 the component identifiers and any additional registered interface information. The additional registered interface information may comprise, for example, a list of operations which the diagnostic provider implements, such as the existence of a state dump operation, the existence of a configuration dump operation, and may further comprise, for example, a list of state-related attributes and/or component-related attributes which the component can dump upon receiving requests therefor. Each component may also register a list of diagnostic tests supported by that component. External programs, such as operations monitor 260 and problem detector 270, may then interact with central service 240 (as shown at 261, 271), using the registered component identifiers and component interfaces (see reference number 242), to perform operations such as monitoring operation of the IT system and aiding in problem detection. One skilled in the art will appreciate that while the central service 240 is depicted as a single entity for ease of reference, such a central service may comprise one or more software modules carrying out the functions of the central service 240. For example, the central service 240 may comprise a first software module with which the component identifiers are registered and which assists in routing callbacks to the appropriate component, and a second software module that manages any additional information pertaining to the diagnostic interfaces (e.g. specification of the operations provided in the component's diagnostic interface). Similarly, the registry 250 may comprise one or more registries.

Using techniques disclosed herein, a message recipient can call back to the originating component and interact with the component further regarding a particular message. For example, the message recipient may gather further information by using the component's diagnostic interface to request state information from the originating component, and/or by requesting configuration information pertaining to the component. As another alternative, the message recipient may use the component's diagnostic interface to request execution of one or more diagnostic tests which are available from that component. The term "message recipient", as used herein, includes human beings such as systems administrators, as well as programmatic processes such as an autonomic problem determination application.

Notably, information needed to call back to the message originator is provided within the message. See sample message format 100 of FIG. 1, where a component's unique identifier 130 is carried within the message payload. Accordingly, external programs can be written to receive messages (or inspect a message log), and where desired, call back to the originating component to execute methods on the component's diagnostic provider interface. In a preferred embodiment, diagnostic provider interfaces provide a known, fixed set of operations, and accordingly, each message will contain an indication that the component implements a diagnostic provider interface, with the external program being aware of the fixed set of available operations. In one alternative embodiment, the message may merely identify the originating component, for example by way of unique component identifier 130 as shown in FIG. 1. In a first version of this embodiment, an external program receiving a message could call back to the originating component to inquire whether the originating component includes a DP interface and if so what operations it implements. In a second version of this embodiment, an external program receiving a message could, using the unique component identifier, consult a central service or registry to determine whether the originating component includes a DP interface, and if so, what operations the DP interface implements. In another alternative embodiment, the message may include a specific indicator of the DP interface, and may further include an indication of the operations implemented by the DP interface, allowing an external program to access the DP interface immediately upon receipt of the message. By calling back to the originating component through the DP interface, the message recipient can gather more information about the general health of a component, which may (for example) prove useful prior to contacting product support. And in some instances, the information which can be obtained through the component's diagnostic interface may enable the message recipient to fully resolve a problem without contacting product support.

As a further advantage of techniques disclosed herein, components no longer need to provide extensive information in messages to be logged, in an attempt to "guess" what logged information will prove useful in the event of a failure. Instead, fewer details may be logged, as techniques disclosed herein enable retrieving more detailed information upon request, using a callback to the diagnostic provider interface of the originating component.

The dynamically invocable operations which may be made available through a component's diagnostic provider interface may vary from one component to another, and each component preferably includes operations deemed useful to diagnostics of that particular component.

The diagnostic provider interface for a particular component may include methods for invoking one or more of the following operations:

viewing the current state of a component which makes additional context-relevant data available viewing the current configuration of a component, which may assist in health-checking the component requesting a list of diagnostic tests provided by a particular component executing a diagnostic test, as defined by a particular component, which may assist in determining the current health of the component (which may, in turn, be indicative of the component's impact on the overall IT system)

changing the level of message logging performed by a component (for example, to signal the component to send further messages providing additional detail regarding the operations of the component)

signaling the component to modify what information it collects internally (e.g., by dynamically activating or deactivating already-present functionality of the component), such that future calls to the diagnostic provider interface will be able (for example) to obtain more-detailed information changing the current configuration of a component, which may assist (for example) in problem recovery Note that while discussions herein are primarily in terms of invoking operations that pertain to components, the diagnostic provider interface may also comprise dynamically-invocable operations for interacting with one or more resources which are accessible from the component. The term "component", as used herein, may comprise a software package that groups a set of related functions. As one alternative, a component may comprise an instance of a resource created by such a package. For example, a component may be a database connection management software package, or a single instance of a connection to a database.

In a preferred embodiment illustrated by FIGS. 3 and 4, the operations for viewing state information, viewing configuration information, obtaining a list of available diagnostics tests, and executing identified ones of those diagnostic tests are shown. In FIG. 3, a sample diagnostic provider interface 300 is illustrated that comprises methods for invoking the above-described operations in a Java™ environment using Java Management Extensions ("JMX"). (Java and all Java-based trademarks are trademarks of Sun Microsystems, Inc. in the United States, other countries, or both.) In FIG. 4, a sample diagnostic provider interface 400 is illustrated that may be used in a web service environment. (These execution environments are discussed in more detail herein.) As will be obvious, these sample interfaces are provided by way of illustration and not of limitation, and it will be obvious, given the teachings provided herein, how these sample interfaces may be extended to support other operations (such as changing message logging, changing configuration, and so forth).

In FIG. 3, for example, the syntax specification for operation 310 indicates that the method signature has a parameter named "attributeId", which is of type "java.lang.String". See reference number 311. The method signature 321 for operation 320 is similar, in this example, while the method signature for operation 340 indicates that the method uses a parameter named "testId", which is of type "java.lang.String". See reference number 341.

FIG. 4A illustrates a port type definition comprising four operations 410, 420, 430, 440, each of which has both a request message and a response message (in this example). These messages are further defined in FIG. 4B. By way of illustration, each request message 411, 421, 431, and 441 has an input parameter for providing an authentication token ("authToken"), which (for this example) is of type "string". See reference number 412. Use of an authentication token is optional, and may be provided on an input request message to enable the receiving component to determine whether the requester is authorized for requesting execution of this request message. Request message 441 further comprises an input parameter, in this example, for identifying a test to be performed by the component. See reference number 442. Response message 415 has an output parameter "currentState" 416, which is used in this example to return the component's current state information to the requester. Similarly, response message 425 has an output parameter "currentConfig" 426, for returning the component's current configuration information. Response message 435 has an output parameter "diagList" 436, which in this example is of type "array" and is used for returning an array of names or identifiers of diagnostic tests supported by the component. Response message 445 has an output parameter "diagResults" for returning results of the test invoked by request message 441. See reference number 446. (As will be obvious, the method signatures may have additional and/or different input and output parameters; the syntax shown in FIGS. 3 and 4 is by way of illustration.)

Note that techniques disclosed herein enable a remote client to optionally invoke operations (not illustrated in FIG. 3 or FIG. 4) that cause a properly-enabled component to dynamically modify its operation. For example, a component may include code that logs debugging-type messages, where operation of this code can be switched on or off through a Boolean flag setting. Using the component's diagnostic provider interface, a requester (such as a remote client) may signal the component to change the setting of the Boolean flag, thereby causing the component to begin logging debugging messages or, conversely, to stop logging such messages. (While a "ChangeMessageLogging" operation has not been illustrated in FIG. 3 or FIG. 4, it will be obvious to one of skill in the art how such interface can be designed and supported, given the teachings provided herein.)

In one approach, a preferred embodiment uses two Java technologies—namely JMX and the java.util.logging package—when implementing the present invention for a Java execution environment, as will now be described in more detail.

JMX is an infrastructure and application programming interface ("API") for managing server resources (such as the components described herein). Management modules may be defined using Java classes referred to as "MBeans". These MBeans may be hosted in a JMX server. As one example environment, a JMX server may run within the WebSphere® Application Server ("WAS") from International Business Machines Corporation ("IBM®"). External programs may communicate with a JMX server using the client API provided by the JMX server implementation. ("IBM" and "WebSphere" are registered trademarks of International Business Machines Corporation in the United States, other countries or both.)

The java.util.logging package provides a logging infrastructure and API. The logging API provides facilities with which to create and log messages to the logging infrastructure. The logging infrastructure provides a means for distributing logged messages to various "handlers". These handlers, in turn, write logged messages to output devices such as a log file, a socket, an automated message e-mailer, and so forth. Customized handlers may be written to write logged messages to particular output devices, if desired.

WAS also adds a DiagnosticProvider Java interface and DiagnosticProvider MBean declaration capability, as well as a custom subclass of the java.util.logging.Logger Java class, for use by a preferred embodiment of the present invention, as will now be described in more detail.

Preferably, WAS provides the DiagnosticProvider interface as part of its core API, where this DiagnosticProvider interface comprises a set of methods (as discussed above with reference to FIG. 3) that are useful to problem determination for any component. Components within a WAS system then provide implementations of this interface. The "stateDump" operation 310, for example, may be provided by a method exposed on the MBean interface that dumps state information for the component for which the method is invoked. The "configDump" operation 320 may be provided by a method exposed on the MBean interface that dumps configuration information for the component for which the method is invoked. The "getSelfDiagnosticList" operation 330 may be provided by a method exposed on the MBean interface that lists the names of tests provided by the component for which the method is invoked, and the "selfDiagnostic" operation 340 may be provided by a method exposed on the MBean interface that executes the named test on the component for which the method is invoked and returns information describing the result.

As one example of self-diagnostics that may be provided, a connection management test might be provided that attempts to get a connection from a particular data source (or other resource pool) to determine if the data source is working properly. As another example, a webContainer may attempt to read a particular test Uniform Resource Locator ("URL") to verify that its infrastructure is working properly. As yet another example, an agent that provides administrative functionality may verify connectivity between a deployment manager (e.g., a central administrative entity) and agents on the nodes it manages.

Preferably, WAS uses the unique identifier ("ID") of the MBean (known as a "JMX ObjectName") as the unique component ID. In the particular embodiment described herein, the unique component ID also serves as the diagnostic provider ID or "DPID". (Alternatively, a message may include a DPID which does not expressly identify the component that generated the message, but instead merely directs an external process to the relevant diagnostic provider interface. Such an approach might be desirable, for example, to avoid exposing the component's identity to the message recipient for security reasons. The use of such a DPID is still considered to identify the generating component (albeit indirectly) because it identifies the relevant diagnostic provider interface to the message recipient, and the diagnostic provider interface is itself part of the generating component.) The JMX ObjectName is generated by the JMX registration code using topology information for the object. (Alternatively, a unique identifier may be generated for components in another way, without deviating from the scope of the present invention, provided this unique identifier is usable for unambiguously routing requests to components.)

The custom subclass of the java.util.logging.Logger Java class is preferably provided as a class which can hold extension data. In a preferred embodiment, the Logger subclass for a particular component holds the component's DPID as an extension. Extension data associated to the Logger subclasses is then included by that logger with each message forwarded to the handlers. In addition to a component's DPID, an example of other data that might be provided using extension data is a vendor name of a vendor who provided the code that is using the Logger.

In another approach, an alternative preferred embodiment may use, in place of JMX and MBeans, web services or another means of remote procedure invocation. (Web services are well known in the art, and a detailed description thereof is not deemed necessary to an understanding of the inventive concepts of the present invention.) Instead of the java.util.logging package, an embodiment of the present invention may use the log4j package or any other logging facility with extensible log events. And instead of using WAS as a base, an embodiment of the present invention may use any application server product, or any componentized software server that supports raising events and which also supports invocation of remote requests.

Returning now to discussion of a WAS-based embodiment, the DiagnosticProvider interface may be used by products within the execution stack and/or other external programs (including third-party software) that are to be integrated into the WebSphere environment (for example, to perform monitoring, to provide added functionality, and so forth). The use of a WAS-based implementation also provides the ability to include a DPID in any message by providing the DPID as one of the message's substitution parameters. This is of benefit in cases where more than one DPID may be used with the same Logger. This situation may be common where a component has different DPIDs for each of its resources that are related to it, but that component does not have a separate Logger for each of these same resources.

Figure 5:
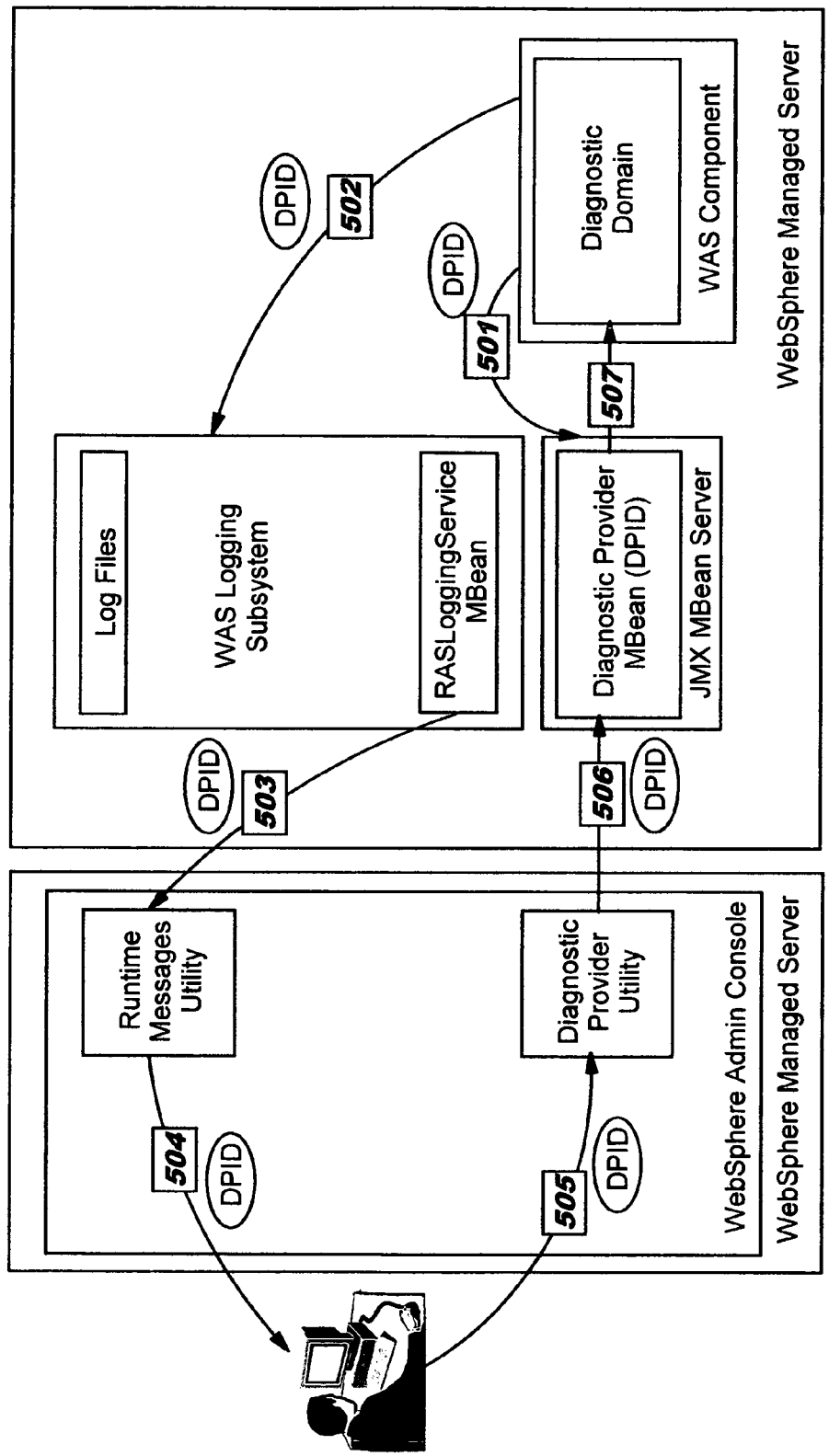
FIG. 5 illustrates use of a preferred embodiment in a particular execution environment.

FIG. 5 illustrates use of a preferred embodiment in a WAS environment. Interactions and flows among components of this preferred embodiment will now be described.

During WAS server start-up, components initialize their DiagnosticProvider MBeans and register them with the JMX MBean server. See flow 501. Also during start-up, each component assigns the JMX ObjectName—which, as stated earlier, is used for the component's DPID—and assigns that value to each of the java.util.logging.Loggers that the component will use to log messages (not shown in FIG. 5) by writing the JMX ObjectName into the Logger's extension data. (As discussed earlier, this DPID is preferably included in the information that is registered with a central service during the registration process.)

At run time, as the component encounters problems, it logs messages to its Loggers. See flow 502. Each message automatically includes the DPID of the MBean, according to preferred embodiments, through functionality of the Logger subclass. (See also FIG. 1, where a sample message format 100 including a component ID 130 is illustrated. As noted above, in the particular embodiment described, the component ID 130 also serves as the DPID because it uniquely identifies the component with which the diagnostic provider interface is associated.) Alternatively, another way of associating a DPID with a message is to provide it as a parameter during the logging of a message, preferably prefaced with an indication that the parameter represents a DPID. The WAS logger subclass will look for this DPID in the message parameters, and will include the DPID in the message passed to the handlers. This may be useful, for example, where a component controls multiple resources, each potentially with its own DPID, while the component may only have one logger.

In a WAS environment, a runtime message utility is preferably provided using a web interface, where this interface displays (or otherwise renders) messages emitted from Loggers, along with their DPIDs, as clickable links. See flow 503, which depicts a message being sent from a logger MBean to the runtime message utility, and flow 504, which depicts this message being sent to a user interface of a user who is referred to herein as an administrator. (Log messages may also, or alternatively, be made available to programmatic processes which may, for example, have registered as listeners. This has not been depicted in FIG. 5. Interactions with a programmatic process in the environment of FIG. 5 are discussed below.)

When an administrator clicks on a selected DPID link, focus of the user interface preferably transfers from the display of messages to a web page that allows the user to choose from among operations that may be invoked against the diagnostic provider interface of the component (i.e., the DiagnosticProvider MBean, in a preferred WAS environment) that is identified by the DPID embodied in the corresponding message. As indicated above, identification of available operations may be made by reference to data stored in a registry, by reference to data embedded in the message itself, or by reference to data provided by the originating component in response to a request for identification of available diagnostic provider interface operations. Alternatively, a particular diagnostic provider interface may be known by a message recipient to include certain operations.

FIG. 6 shows an illustrative user interface display 600 that may be rendered for a hypothetical set of logged messages 610-612. In this example, the DPID is shown as underlined to convey to the administrator that this value can be clicked upon for further information. Suppose the administrator clicks on the DPID for message 610 (a message generated by a component identified as "ComponentABC"). FIG. 7 provides a sample web page display 700 that may be rendered, responsive to this selection. As shown therein, a number of component-provided details may be rendered to more fully explain the selected message 610. Web page display 700 also provides graphical buttons 710-712, in this example, with which the administrator can invoke operations from the component's diagnostic provider interface. In FIG. 7, the choices allow the administrator to request state data from the component (see 710), to request configuration data from the component (see 711), or to request execution of self-diagnostic tests by the component (see 712). As will be obvious, selection techniques other than graphical buttons may be used without deviating from the scope of the present invention.

Once the administrator chooses the operation to invoke (see flow 505 of FIG. 5), the diagnostic provider utility interacts with the JMX MBean server, invoking the corresponding method on the DiagnosticProvider MBean of the component identified by the DPID in the logged message (see flow 506).

The DiagnosticProvider MBean then interacts with the component that originated the logged message, where this interaction may comprise requesting state data, configuration data, etc., or requesting execution of self diagnostic tests, according to the administrator's request. See flow 507. The results of the invoked method are then preferably provided for display to the administrator, using the web page interface.

As an alternate flow, a programmatic process such as an autonomic problem determination application may take the place of the administrator shown in FIG. 5. In this scenario, the programmatic process receives messages from the server and invokes methods on the component MBeans identified by the DPIDs contained in the logged messages.

Figure 8:
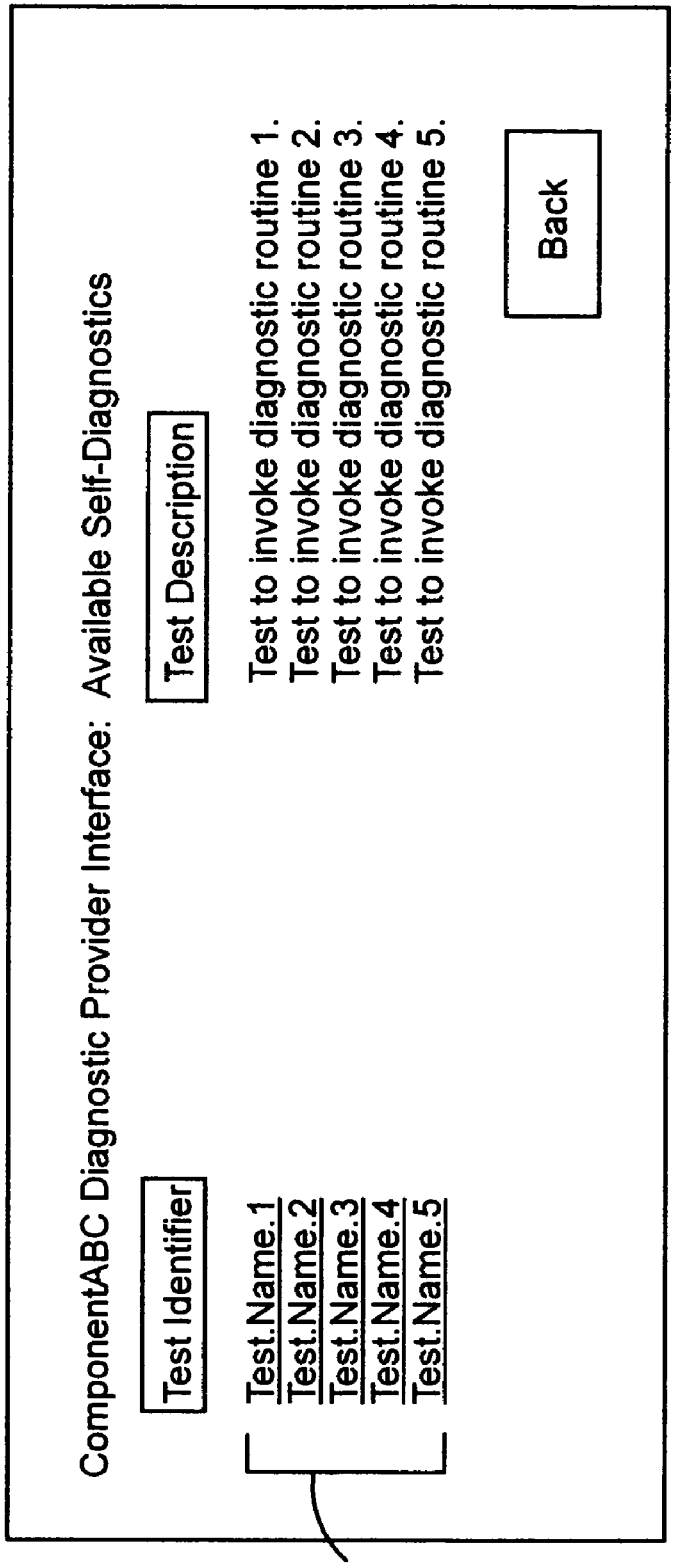
FIG. 8 illustrates a sample web page that may be displayed in response to an administrator's request to a component, asking for a list of the component's available diagnostic tests.

Optionally, a component may provide a selection of self-diagnostics, as discussed briefly above. In this case, a graphical button provided on web page display 700 (such as graphical button 712, for example) may request the component to return a list of its available tests. FIG. 8 illustrates a sample web page 800 that may be displayed in response, whereby a clickable link is provided for each test available from the component (see, generally, 810), and whereby clicking on a selected link then preferably invokes execution of the corresponding test. Following execution of the diagnostic test, a web page display is preferably rendered for the administrator to provide results of the test (not shown).

Figure 9:
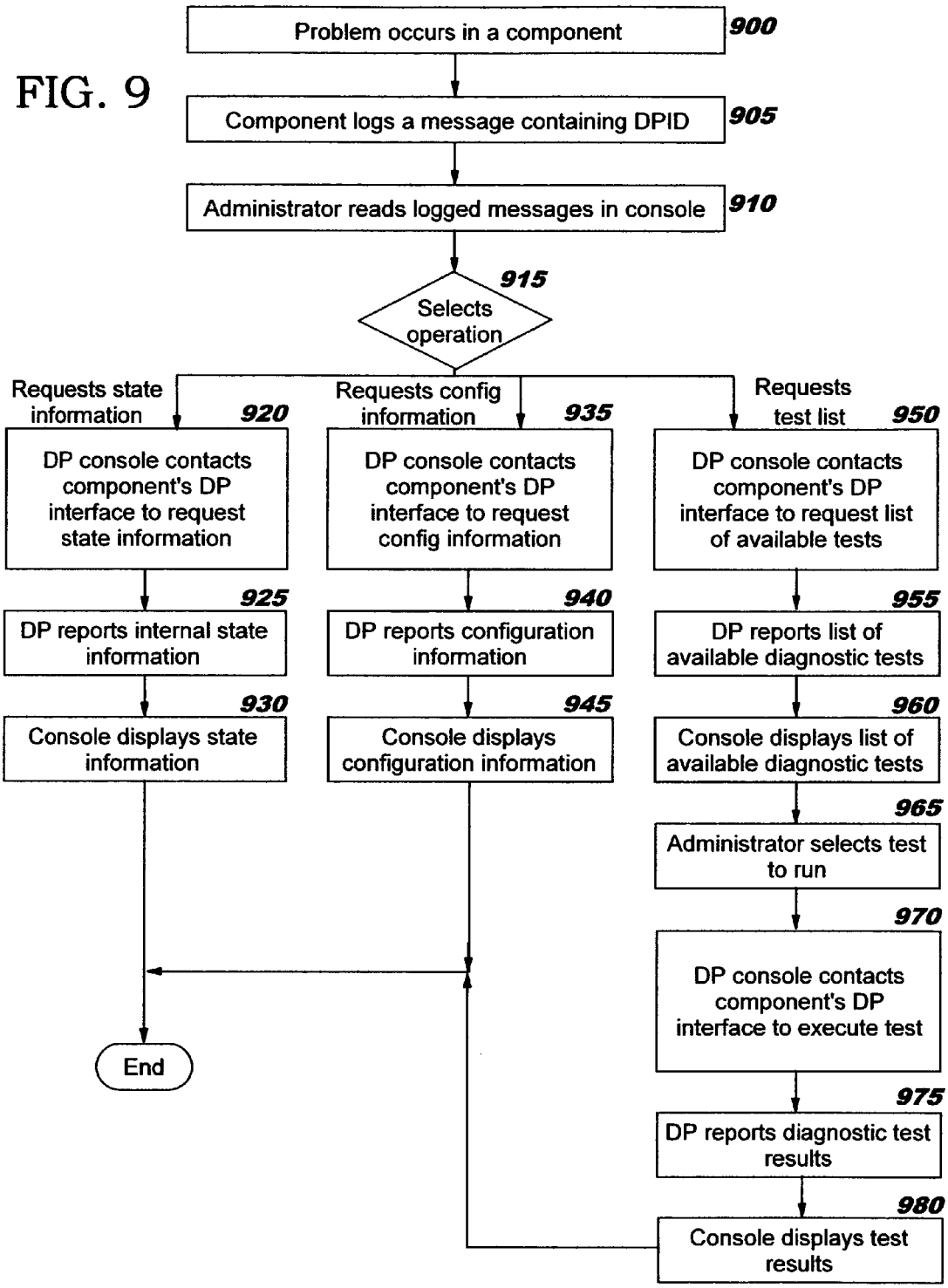
FIG. 9 provides a flowchart depicting logic that may be used when implementing a preferred embodiment of the present invention.

Turning now to FIG. 9, a flowchart is provided that depicts logic that may be used when implementing a preferred embodiment of the present invention. As shown in FIG. 9, when a problem occurs in a component (Block 900), the component logs a message containing a DPID (Block 905). The administrator reads a logged message from a user interface such as a message console (Block 910), and then may select an operation available from the corresponding component's diagnostic provider interface (Block 915). Alternatively, Block 915 may represent the administrator selecting an operation available from the diagnostic provider interface of a component that is different from the component that generated the logged message. This may be useful, for example, if a particular component is unaware that it has a problem, but that problem is causing other components to log messages (e.g., because the component which has the problem is sending corrupted data, which is then recognized by the other components as being corrupt). FIG. 7, discussed above, presents a sample diagnostic provider interface display from which operations can be selected.

If the selected operation is to view state information of the component, then the diagnostic provider console invokes a method of the component's diagnostic provider interface to request state information (Block 920). In preferred embodiments, the diagnostic provider interface reports internal state information that is gathered using logic provided by the component implementation (Block 925). Optionally, an input parameter may be supported that informs the component of pertinent parts of the component's available state information that are of interest to the requester (as illustrated by reference number 311 in FIG. 3A), although this has not been illustrated in FIG. 9. The state information returned by the component is then displayed on the diagnostic provider console (Block 930), after which the processing of this invocation of the logic in FIG. 9 ends.

If the selected operation is to view configuration information of the component, then the diagnostic provider console invokes a method of the component's diagnostic provider interface to request configuration information (Block 935). In preferred embodiments, the diagnostic provider interface reports configuration information that is gathered using logic provided by the component implementation (Block 940). Optionally, an input parameter may be supported that informs the component of pertinent parts of the component's available configuration information that are of interest to the requester (as illustrated by reference number 321 in FIG. 3A), although this has not been illustrated in FIG. 9. The configuration information returned by the component is then displayed on the diagnostic provider console (Block 945), after which the processing of this invocation of the logic in FIG. 9 ends.

In a preferred embodiment, various components may implement different sets of self-diagnostic tests, since certain tests may be useful for one or some components but of little or no value to other components. Accordingly, if the selected operation is to perform diagnostic tests which are available from the component, then in one approach, the diagnostic provider console invokes a method of the component's diagnostic provider interface to request a list of the available tests (Block 950). Preferably, the list of tests is returned by the component (Block 955) for display on the diagnostic provider console (Block 960). (In one alternative approach, information about available tests for the various DP interfaces is stored in a registry, and a list of available tests may be retrieved from the registry for presentation to the administrator. In a second alternative approach, information representing the available tests may be included in the message itself. For example, an abbreviated code could be included in the message, and the message recipient could have access to a table containing information about the correspondence between abbreviated codes and available tests implemented by the diagnostic provider interface. Where a limited number of tests are potentially available depending on the diagnostic provider interface, a simple integer or bit mask may be sufficient as a code. In a third alternative approach, diagnostic provider interfaces may have uniform self-diagnostic testing capabilities, and the message recipient may be aware of those uniform capabilities.) FIG. 8, discussed above, depicts a sample list of tests available from a hypothetical component. The administrator may then select a test from this display (Block 965), and in response, the diagnostic provider console invokes a corresponding method to execute the selected test (Block 970). In preferred embodiments, the diagnostic provider interface reports the test results that are provided by the component implementation (Block 975). These results are then displayed on the diagnostic provider console (Block 980), after which the processing of this invocation of the logic in FIG. 9 ends.

In an alternative approach, a component may implement a single diagnostic test, or a collection of diagnostic tests which are invoked using a single request, in which case the processing of Blocks 950-965 may be omitted. Or, as illustrated in the method signatures in FIGS. 3B and 4B (see reference numbers 340 and 441, respectively), a parameter may be specified on the method invocation to inform the component of the particular diagnostic test(s) to be executed. (See references numbers 341 and 442, where a "testID" parameter is illustrated for this purpose.)

Optionally, the diagnostic provider console may be modeled as a dashboard interface, whereby different colors—such as green, yellow, and red—are used to graphically indicate the health of the overall system and/or components thereof. In this approach, as the logs are monitored for incoming messages, callbacks may be invoked to gather further information for each message or for selected messages (such as all messages for which a red indicator is appropriate). An automated analysis may be performed of the returned information, and a color may then be selected to represent the health of the component on the dashboard interface.

Note that while preferred embodiments have been described herein with reference to code from the Java programming language, and execution in a Java run-time environment, this is by way of illustration and not of limitation. Alternative execution environments include a web services environment, as has been discussed.

Furthermore, while preferred embodiments have been described with reference to invoking methods from a component's diagnostic provider interface responsive to a logged message from the component, the disclosed techniques may also be used responsive to an alert generated by a component (where the alert contains the component's DPID, in a similar manner to that which has been described for messages). Methods from the diagnostic provider interface may also be invoked, for example, in response to evaluation of messages in a log at some variable time after the messages have been entered into the log. Furthermore, methods from a component's diagnostic provider interface may be invoked in an unsolicited manner (i.e., without regard to particular logged messages or alerts), for example by obtaining a component's unique identifier and diagnostic provider interface from the information the component registered with the central service 240 of FIG. 2 during initialization.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 10:
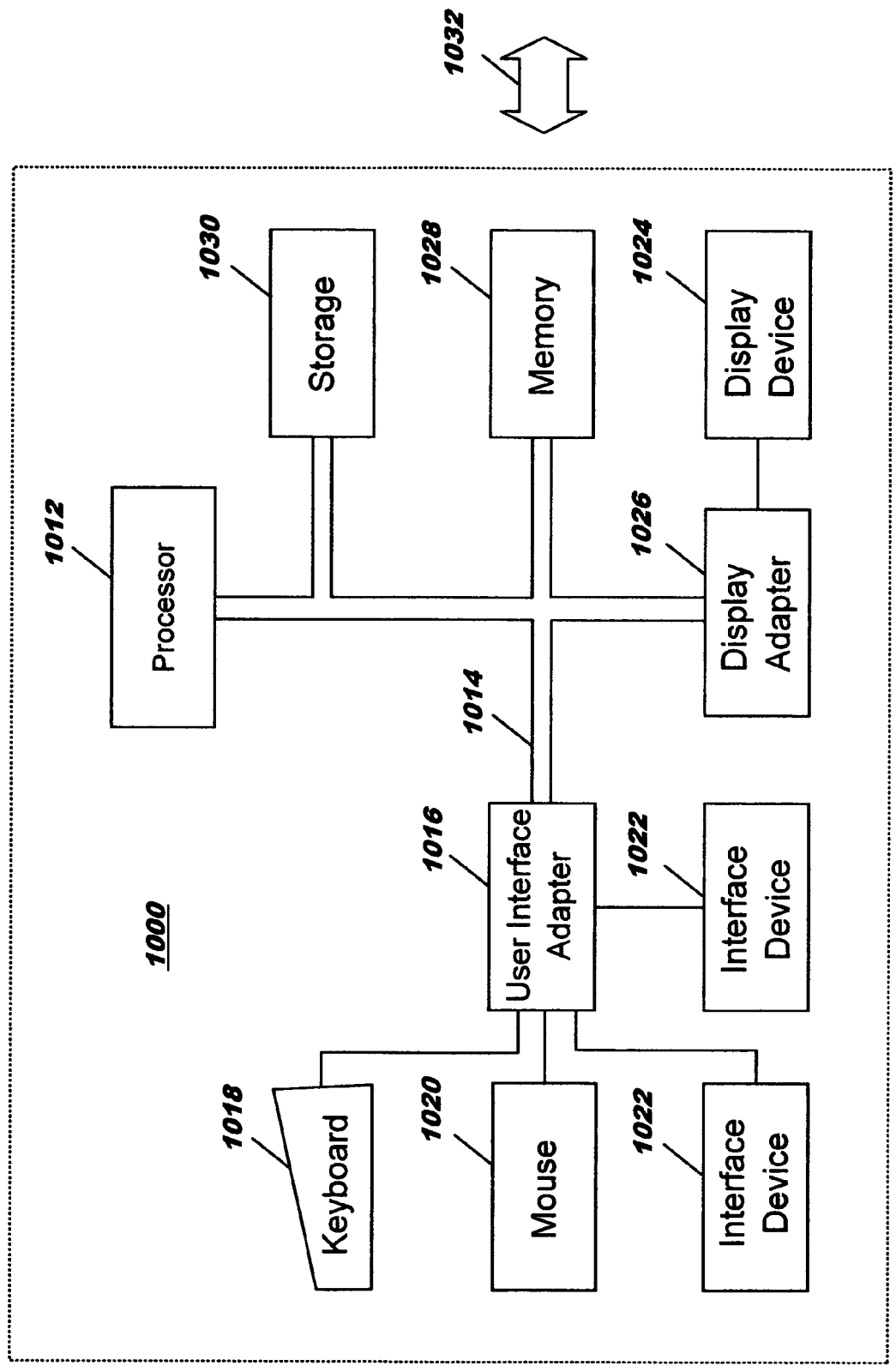
FIG. 10 depicts a data processing system suitable for storing and/or executing program code.

Referring now to FIG. 10, a data processing system 1000 suitable for storing and/or executing program code includes at least one processor 1012 coupled directly or indirectly to memory elements through a system bus 1014. The memory elements can include local memory 1028 employed during actual execution of the program code, bulk storage 1030, and cache memories (not shown) which provide temporary storage of at least some program code in order to reduce the number of times code must be retrieved from bulk storage during execution.

Input/output ("I/O") devices (including but not limited to keyboards 1018, displays 1024, pointing devices 1020, other interface devices 1022, etc.) can be coupled to the system either directly or through intervening I/O controllers or adapters (1016, 1026).

Network adapters may also be coupled to the system to enable the data processing system to become coupled to other data processing systems or remote printers or storage devices through intervening private or public networks (as shown generally at 1032). Modems, cable modem attachments, wireless adapters, and Ethernet cards are just a few of the currently-available types of network adapters.

Figure 11:
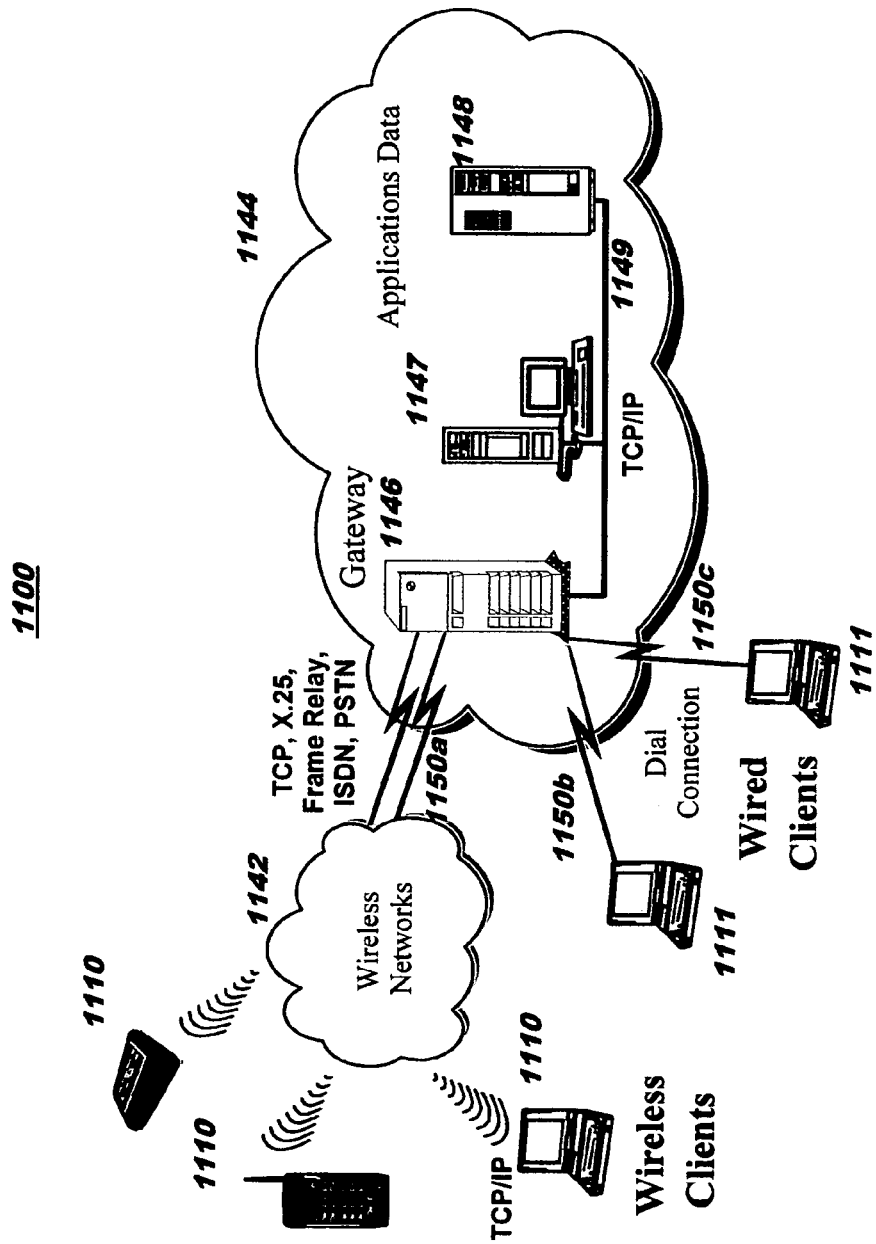
FIG. 11 depicts a representative networking environment in which one or more embodiments of the present invention may be used.

FIG. 11 illustrates a data processing network environment 1100 in which the present invention may be practiced. The data processing network 1100 may include a plurality of individual networks, such as wireless network 1142 and network 1144. A plurality of wireless devices 1110 may communicate over wireless network 1142, and a plurality of wired devices, shown in the figure (by way of illustration) as workstations 1111, may communicate over network 1144. Additionally, as those skilled in the art will appreciate, one or more local area networks ("LANs") may be included (not shown), where a LAN may comprise a plurality of devices coupled to a host processor.

Still referring to FIG. 11, the networks 1142 and 1144 may also include mainframe computers or servers, such as a gateway computer 1146 or application server 1147 (which may access a data repository 1148). A gateway computer 1146 serves as a point of entry into each network, such as network 1144. The gateway 1146 may be preferably coupled to another network 1142 by means of a communications link 1150a The gateway 1146 may also be directly coupled to one or more workstations 1111 using a communications link 1150b, 1150c, and/or may be indirectly coupled to such devices. The gateway computer 1146 may be implemented utilizing an Enterprise Systems Architecture/390® computer available from IBM. Depending on the application, a midrange computer, such as an Application System/400® (also known as an AS/400® may be employed. ("Enterprise Systems Architecture/390", "Application System/400", and "AS/400" are registered trademarks of IBM in the United States, other countries, or both.)

The gateway computer 1146 may also be coupled 1149 to a storage device (such as data repository 1148).

Those skilled in the art will appreciate that the gateway computer 1146 may be located a great geographic distance from the network 1142, and similarly, the wireless devices 1110 and/or workstations 1111 may be located some distance from the networks 1142 and 1144, respectively. For example, the network 1142 may be located in California, while the gateway 1146 may be located in Texas, and one or more of the workstations 1111 may be located in Florida. The wireless devices 1110 may connect to the wireless network 1142 using a networking protocol such as the Transmission Control Protocol/Internet Protocol ("TCP/IP") over a number of alternative connection media, such as cellular phone, radio frequency networks, satellite networks, etc. The wireless network 1142 preferably connects to the gateway 1146 using a network connection 1150a such as TCP or User Datagram Protocol ("UDP") over IP, X.25, Frame Relay, Integrated Services Digital Network ("ISDN"), Public Switched Telephone Network ("PSTN"), etc. The workstations 1111 may connect directly to the gateway 1146 using dial connections 1150b or 1150c. Further, the wireless network 1142 and network 1144 may connect to one or more other networks (not shown), in an analogous manner to that depicted in FIG. 11.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A computer-implemented component diagnostic method, comprising:

including, in each message generated by each of a plurality of components, a unique component identifier that identifies the generating component; and providing, for each of the components, a diagnostic provider interface, the diagnostic provider interface for each component comprising at least one operation implemented by that component, the operation being invocable by a callback to the component, wherein the unique component identifiers enable identifying that one of the components to which each callback is to be routed.

2. The method according to claim 1, further comprising executing at least one of the operations provided in the diagnostic provider interface of a selected one of the components in response to an invocation by a callback received at the selected component.

3. The method according to claim 2, wherein the received callback comprises a request for further information from the selected component.

4. The method according to claim 3, wherein the requested further information comprises current state information of the selected component.

5. The method according to claim 3, wherein the requested further information comprises current configuration information of the selected component.

6. The method according to claim 2, wherein the received callback comprises one of a request for the selected component to provide a list of diagnostic tests available for execution by the selected component or a request for execution of at least one diagnostic test by the selected component.

7. The method according to claim 2, wherein the received callback is generated responsive to evaluation of at least one of the messages generated by the selected component.

8. The method according to claim 2, wherein the received callback is generated responsive to evaluation of at least one of the messages generated by at least one of the components, the at least one of the components being distinct from the selected component.

9. The method according to claim 1, further comprising including, in each alert generated by each of the components, the unique component identifier for identifying the generating component.

10. The method according to claim 9, further comprising executing at least one of the operations provided in the diagnostic provider interface of a selected one of the components in response to an invocation by a callback received at the selected component, wherein the received callback is generated in response to evaluation of at least one of the alerts generated by the selected component.

11. The method according to claim 9, further comprising executing at least one of the operations provided in the diagnostic provider interface of a selected one of the components in response to an invocation by a callback received at the selected component, wherein the received callback is generated in response to evaluation of at least one of the alerts generated by at least one of the components, the at least one of the components being distinct from the selected component.

12. The method according to claim 1, further comprising registering the unique component identifier during an initialization phase, wherein each unique component identifier includes information indicating existence of the diagnostic interface provided for each respective component.

13. The method according to claim 12, further comprising registering a diagnostic interface specification for each component.

14. The method according to claim 13, wherein the diagnostic interface specification supported by each component specifies a method signature for each of the invocable operations implemented by that component.

15. The method according to claim 14, wherein the method signature for at least one of the invocable operations comprises a (parameter name, parameter type) pair for each parameter of that invocable operation.

16. The method according to claim 13, wherein the diagnostic interface provided for each component specifies at least one of at least one state attribute for which state information can be dumped by that component, at least one configuration attribute for which configuration information can be dumped by that component, and at least one diagnostic test that can be carried out by that component.

17. The method according to claim 1, further comprising generating, for each of the components, the unique component identifier during an initialization of the component.

18. The method according to claim 17, wherein the unique component identifier for each component is generated as a unique object name of an instance of the component.

19. The method according to claim 17, wherein the unique component identifier for each component is generated using topology information of the component.

20. The method according to claim 1, further comprising:
including, in each message generated for at least one resource which is accessible from a selected one of the components, the unique component identifier that identifies the selected component; and
providing, in the diagnostic provider interface for the selected component, at least one operation implemented by the selected component, the operation being invocable by a callback to the selected component to interact with each of the at least one resources.

21. The method according to claim 20, further comprising executing, for a selected one of the resources which is accessible from the selected component, at least one of the operations provided in the diagnostic provider interface of the selected component in response to an invocation by a callback received at the selected component to interact with the selected resource.

22. The method according to claim 2, wherein the callback for each of the at least one operations uses the unique component identifier of the selected component.

23. A programmatic method of performing component diagnostics, comprising:
including, in each message generated by each of a plurality of components, a unique component identifier that identifies the generating component;
providing, for each of the components, a diagnostic provider interface for that component, the diagnostic provider interface for each component comprising at least one invocable operation implemented by that component, the operation being invocable by a callback to the component; and
using the unique component identifiers to route callbacks to selected ones of the components, wherein each of the callbacks comprises invoking one of the at least one invocable operations implemented by the selected one of the components.

24. A programmatic method of component diagnosis, comprising:
evaluating at least one message generated by a component, wherein the evaluated message comprises a unique component identifier that identifies the generating component;
identifying an operation implemented by the component in a diagnostic provider interface; and
using the unique component identifier from the at least one evaluated message in an invocation that calls back to the component to request execution of the identified operation, thereby enabling routing of the invocation to the component.

25. The method according to claim 24, wherein the operation is identified by a registry in which the component registers each of at least one operation implemented in its diagnostic provider interface.

26. The method according to claim 24, wherein the operation comprises one of a request for the component to dump state information, a request for the component to dump configuration information, a request for the component to provide a list of diagnostic tests available for execution by the component, or a request for the component to execute at least one diagnostic test.

* * * * *